United States Patent [19]

McLaughlin

[11] Patent Number: 5,244,059
[45] Date of Patent: Sep. 14, 1993

[54] ENGINE PRE-OILER

[76] Inventor: Norman L. McLaughlin, 1408 Childs Rd. East, Bellevue, Nebr. 68005

[21] Appl. No.: 871,937

[22] Filed: Apr. 21, 1992

[51] Int. Cl.$^5$ .......................... F01M 9/00; F01M 1/00
[52] U.S. Cl. ...................... 184/6.3; 184/29; 184/55.1; 123/196 R
[58] Field of Search ................. 184/6.3, 29, 39, 55.1, 184/108; 123/196 R

[56] References Cited

U.S. PATENT DOCUMENTS

| | | | |
|---|---|---|---|
| 2,755,787 | 7/1956 | Butler et al. | 184/6.3 |
| 3,583,525 | 6/1971 | Holcomb | 184/6.3 |
| 4,094,293 | 6/1978 | Evans | 184/6.3 |
| 4,199,950 | 4/1980 | Hankanson et al. | 184/6.3 |
| 4,893,598 | 1/1990 | Stasiuk | 123/196 R |
| 5,012,897 | 5/1991 | Jorissen | 184/39 |
| 5,156,120 | 10/1992 | Kent | 184/6.3 |
| 5,197,424 | 3/1993 | Blum | 184/6.3 |

FOREIGN PATENT DOCUMENTS

| | | | |
|---|---|---|---|
| 3804755 | 8/1989 | Fed. Rep. of Germany | 184/6.3 |
| 0585306 | 12/1977 | U.S.S.R. | 184/6.3 |

*Primary Examiner*—Thomas E. Denion
*Attorney, Agent, or Firm*—Zarley, McKee, Thomte, Voorhees & Sease

[57] ABSTRACT

An engine pre-oiler is provided which has an oil chamber and an air chamber separated by a movable diaphragm with bonded steel plate. The air chamber of the pre-oiler is operatively connected to the air source on the vehicle. The oil chamber is refilled from the engine and the air pressure supplied to the air chamber forces the oil, during the pre-oil cycle, to the engine.

7 Claims, 6 Drawing Sheets

5,244,059

ENGINE PRE-OILER

BACKGROUND OF THE INVENTION

This invention relates to an engine pre-oiler and more particularly to an improved engine pre-oiler.

Many types of engine pre-oilers have been previously provided in an attempt to pre-oil certain moving parts of an engine prior to the engine being adequately oiled or lubricated by the engine lubrication system. The prior art devices suffer from many disadvantages. One disadvantage of certain prior art engine pre-oilers is that they do not adequately lubricate the engine. Yet another disadvantage of the prior art pre-oilers is that they are extremely complicated and cumbersome. Still another disadvantage of the prior art pre-oilers is that they do not have sufficient safeties associated therewith to prevent damage to the engine should the pre-oiler improperly function. Yet another disadvantage of the prior art pre-oilers is that they are extremely costly.

It is therefore a principal object of the invention to provide an improved engine pre-oiler.

A further object of the invention is to provide an engine pre-oiler which provides sufficient lubrication to the engine.

Still another object of the invention is to provide an engine pre-oiler which utilizes air pressure to force oil to moving parts of the engine prior to the engine being started.

Still another object of the invention is to provide an engine pre-oiler which includes safeties associated therewith to prevent damage to the engine should the pre-oiler fail for some unexplained reason.

Still another object of the invention is to provide an engine pre-oiler which is relatively simple and which may be installed on existing trucks.

Another object of this pre-oiler is to provide warm oil to the engine prior to cranking to aid in cold weather start-up.

Yet another object of the invention is to provide an engine pre-oiler which is economical of manufacture and durable in use.

These and other objects will be apparent to those skilled in the art.

SUMMARY OF THE INVENTION

Figure 1:
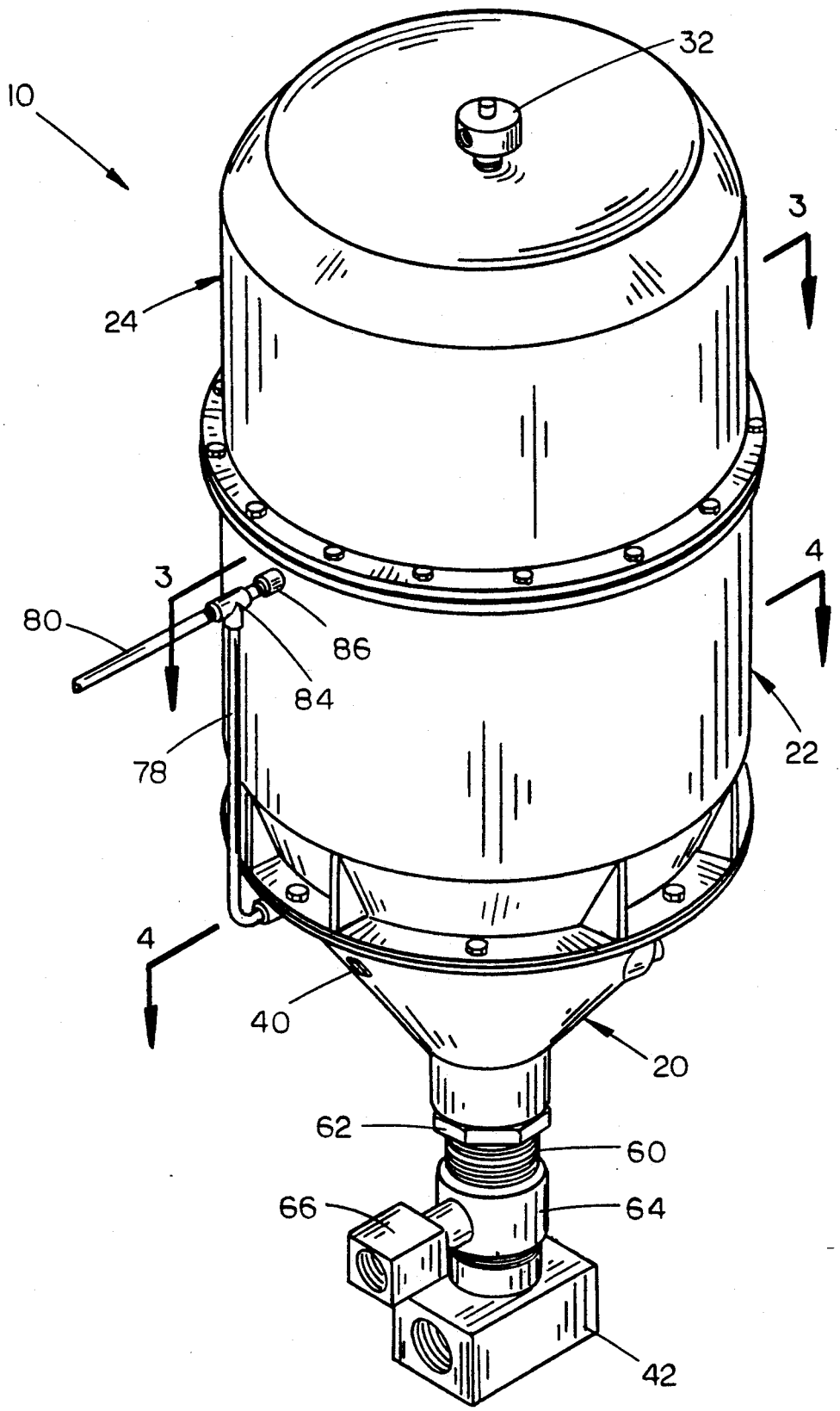
FIG. 1 is a perspective view of the pre-oiler of this invention.
Figure 2:
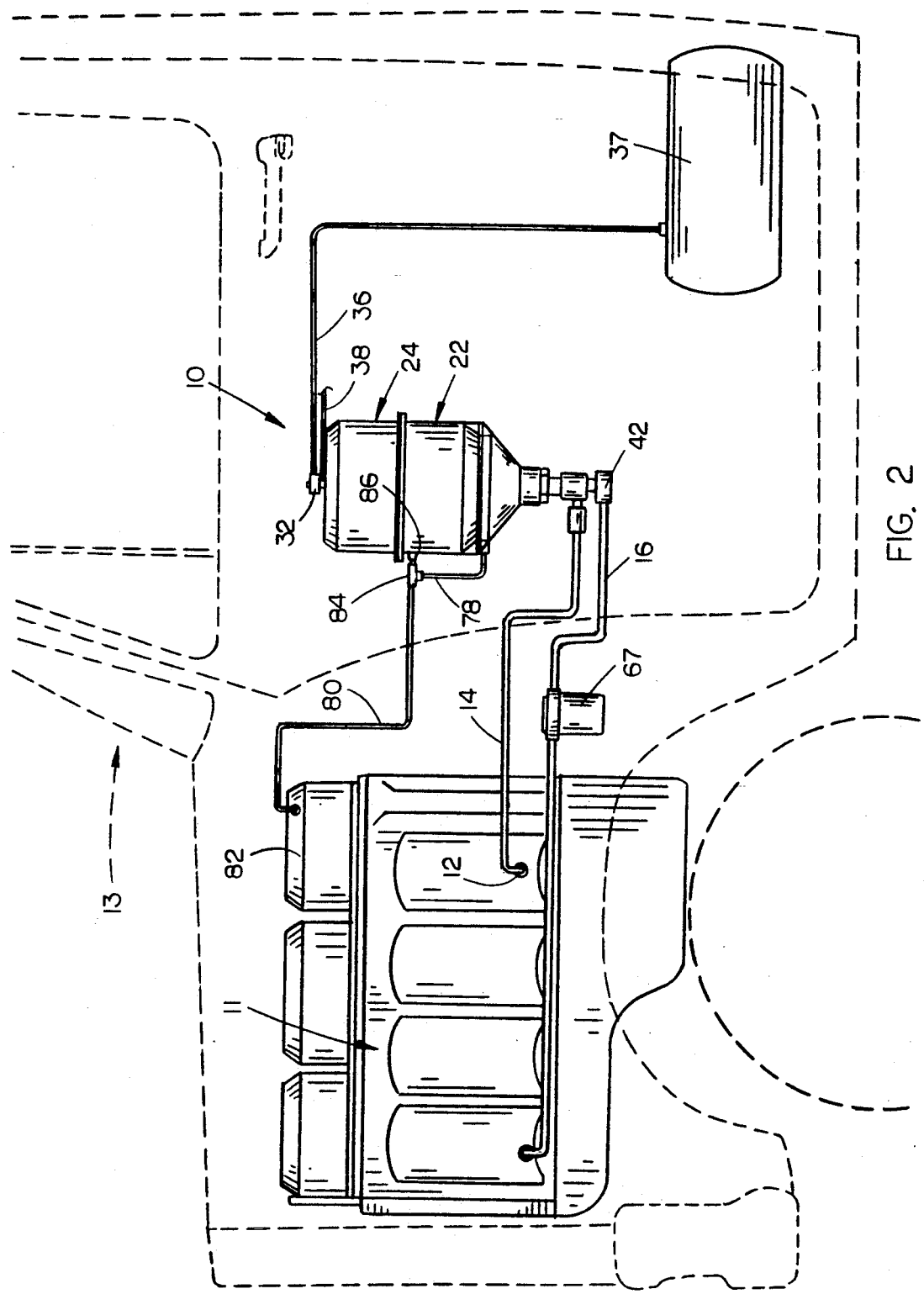
FIG. 2 is a schematic of the pre-oiler of this invention and its association with respect to the truck engine.
Figure 3:
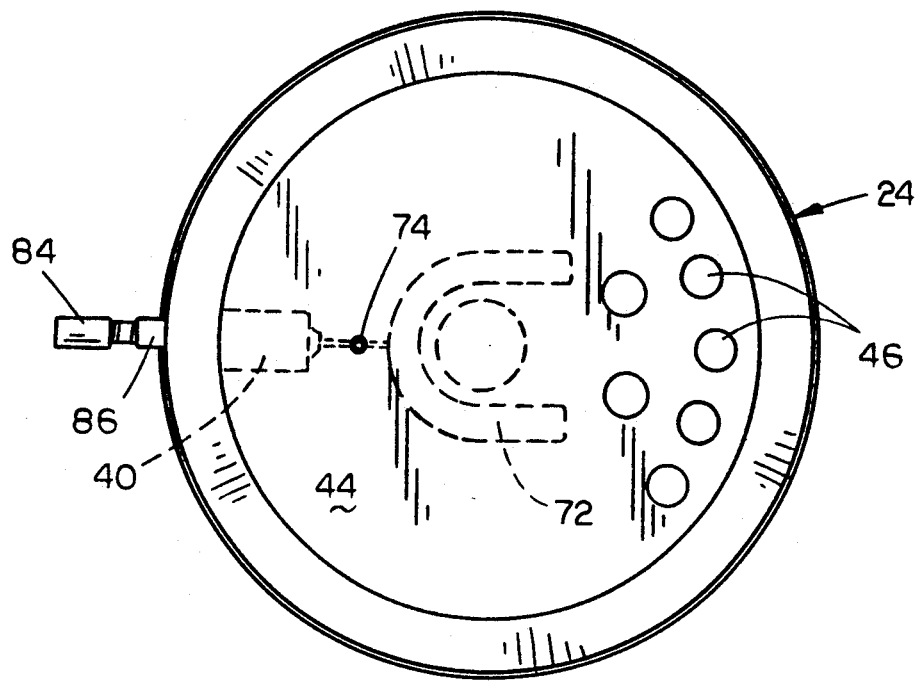
FIG. 3 is a sectional view as seen on lines 3—3 of FIG. 5.
Figure 4:
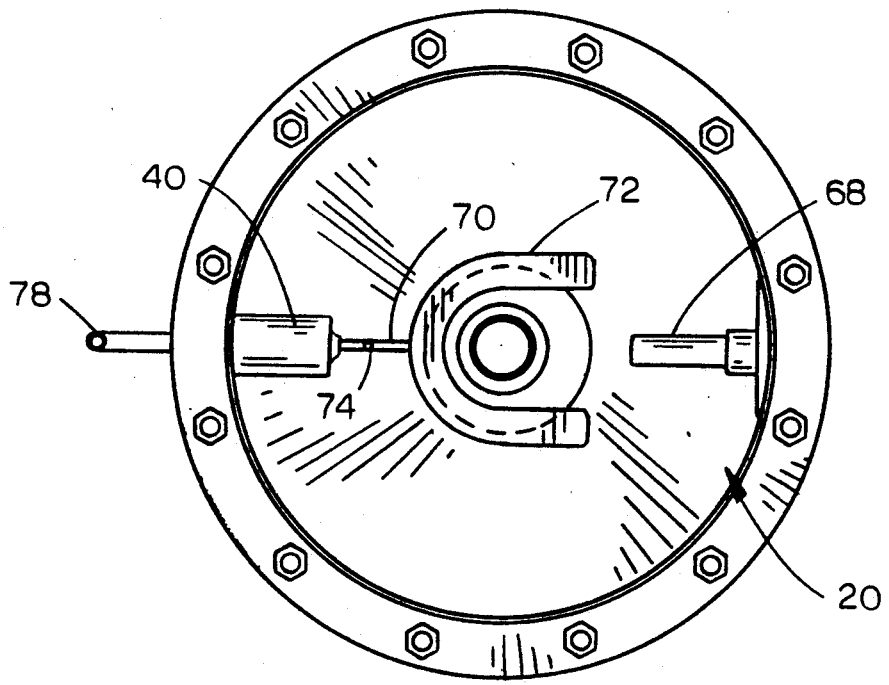
FIG. 4 is a sectional view as seen on lines 4—4 of FIG. 5.

A pre-oiler is described for pre-oiling an engine including a hollow body portion having a hollow float body assembly secured to the lower end thereof and an air valve assembly secured to the upper end thereof. The upper interior of the hollow body portion is in fluid communication with the lower interior of the air valve assembly and the lower interior of the hollow body portion is in fluid communication with the upper interior of the float body assembly. The air valve assembly has an air inlet in communication with the interior thereof and which is in communication with a source of air under pressure. A solenoid operated air valve is provided in the air inlet for normally closing the air inlet. A diaphragm with a steel bonded plated is movably mounted in the body portion and sealably divides the body portion into an oil chamber therebelow and an air chamber thereabove. The float body assembly has an oil outlet extending therefrom to the engine being lubricated and has a solenoid operated or oil valve imposed therein for normally closing the oil outlet. The float body assembly has an oil inlet in communication with the interior which is in communication with a source of oil under pressure. A float switch in the float body assembly is series connected to the air valve solenoid and the oil valve solenoid. An actuator is provided on the float arm of the float switch to open the float switch when the diaphragm drops to a predetermined level. The float switch de-activates the air and oil valves when the oil in the float body assembly drops to a predetermined level. Control means is provided for actuating the solenoids of the air and oil valves and for actuating the float switch when it is desired to pre-oil the engine. The pre-oiler includes safety means to prevent damage to the engine should the pre-oiler or its associated equipment fail for any reason.

BRIEF DESCRIPTION OF THE PREFERRED EMBODIMENT

The engine pre-oiler of this invention is referred to generally by the reference numeral 10 and is designed to pre-lubricate a diesel engine 11 or the like utilized on a truck 13 or the like. The diesel engine 11 provides a source of oil under pressure for the pre-oiler. The source is referred to generally by the reference numeral 12, from which extends oil line 14. Oil line 16 extends to the diesel engine for lubricating the various moving parts in the engine. The engine pre-oiler 10 is located on the truck in any convenient location and is controlled by a key switch 18 which may be incorporated into the ignition switch of the truck if so desired.

Figure 5:
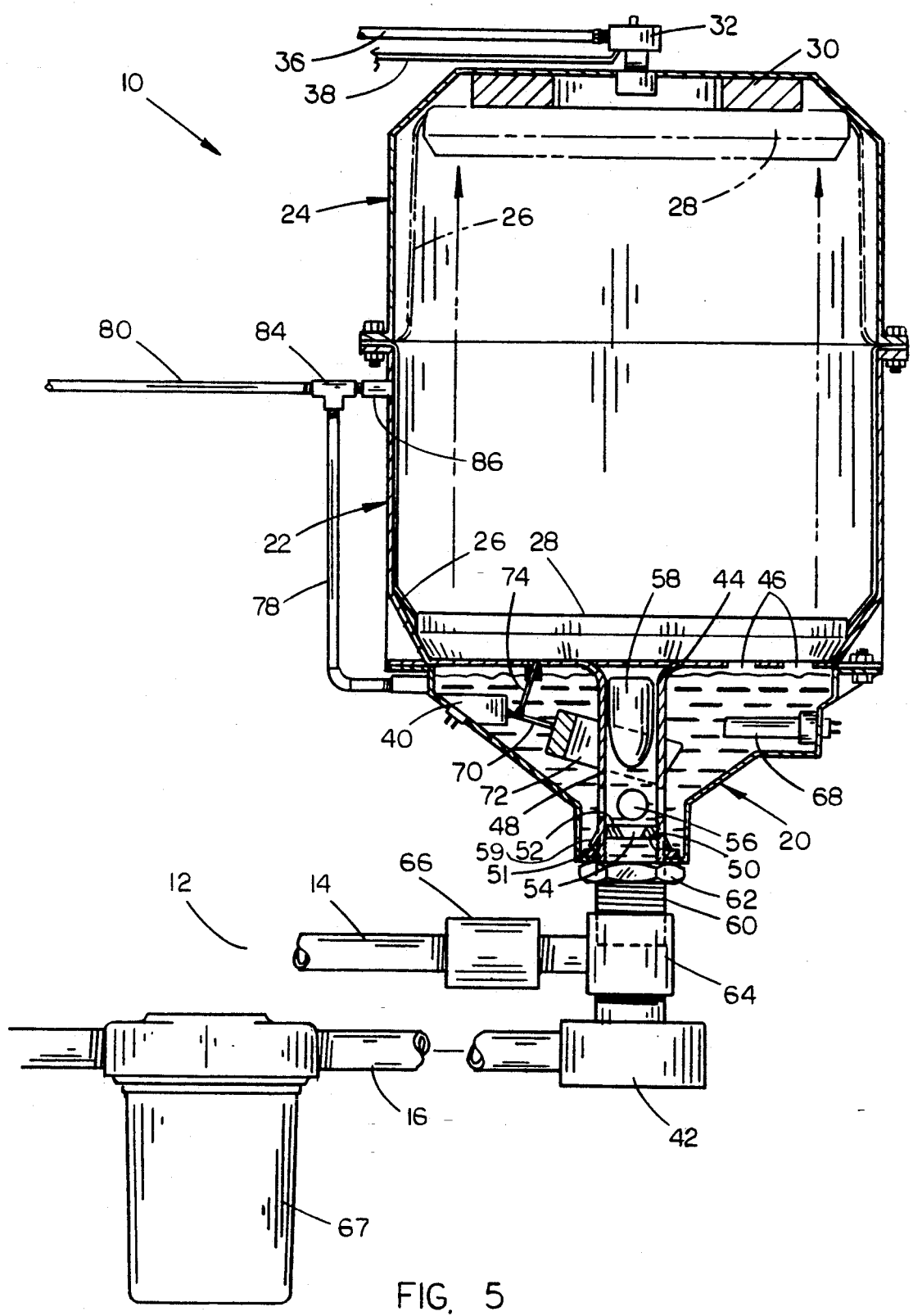
FIG. 5 is a partial sectional view of the pre-oiler of this invention.
Figure 6:
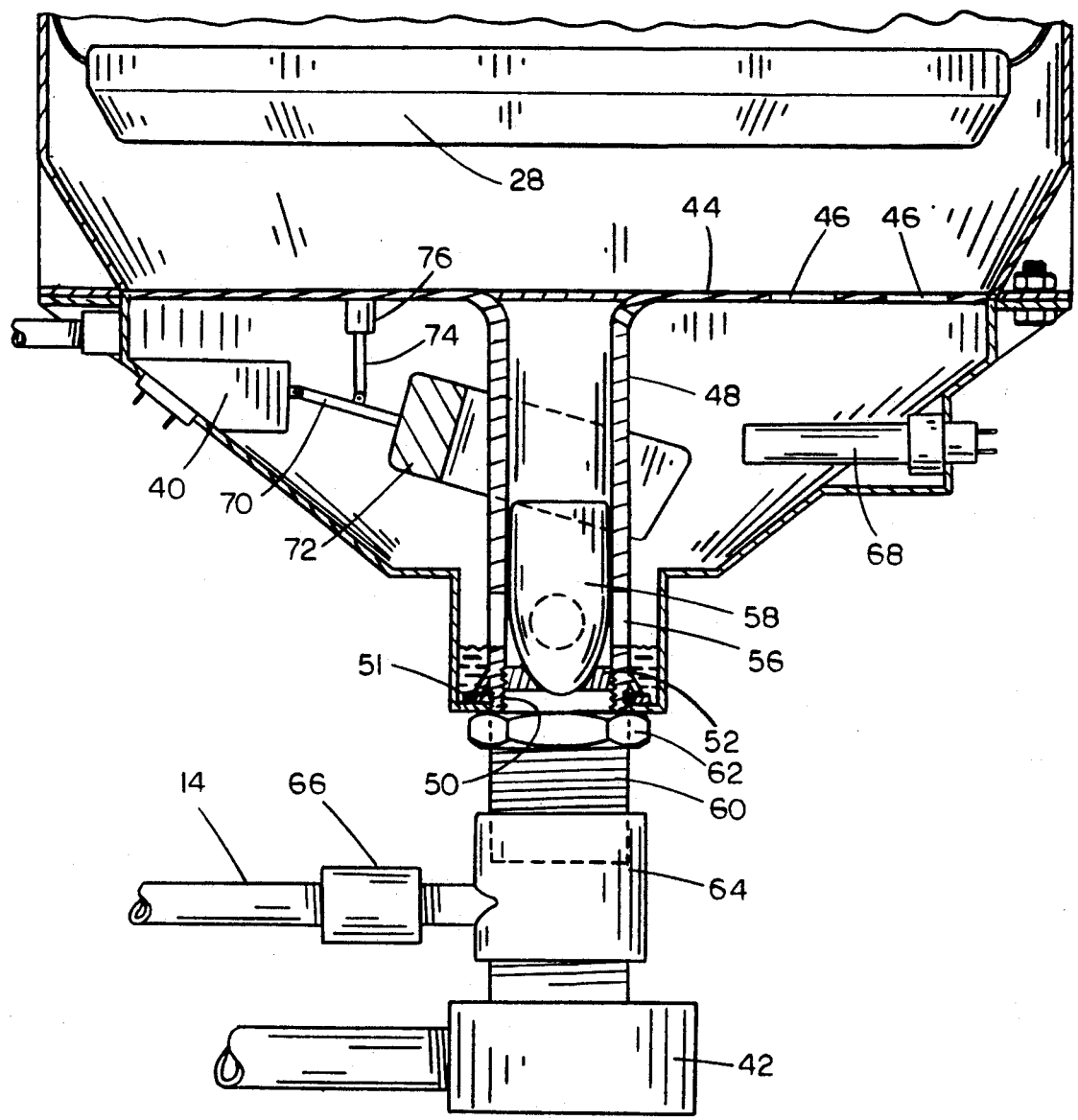
FIG. 6 is a partial sectional view of the lower portion of the pre-oiler of this invention.

Pre-oiler 10 includes a float body assembly 20 which is bolted or otherwise secured to the lower end of a cylindrical body portion 22 as seen in FIG. 5. The upper end of body portion 22 is bolted or otherwise secured to the lower end of an air valve assembly 24. The periphery of a flexible diaphragm is positioned between the mating flanges of body portion 22 and air valve assembly 24 (FIG. 5). Steel plate 28 is bonded to diaphragm 26 for movement between the positions illustrated by solid and broken lines in FIG. 5. Ring magnet 30 is positioned in the upper interior of air valve assembly 24 to limit the upward movement of plate 28 as seen in FIG. 5 and to hold plate 28 in position to prevent bleed-down.

Figure 7:
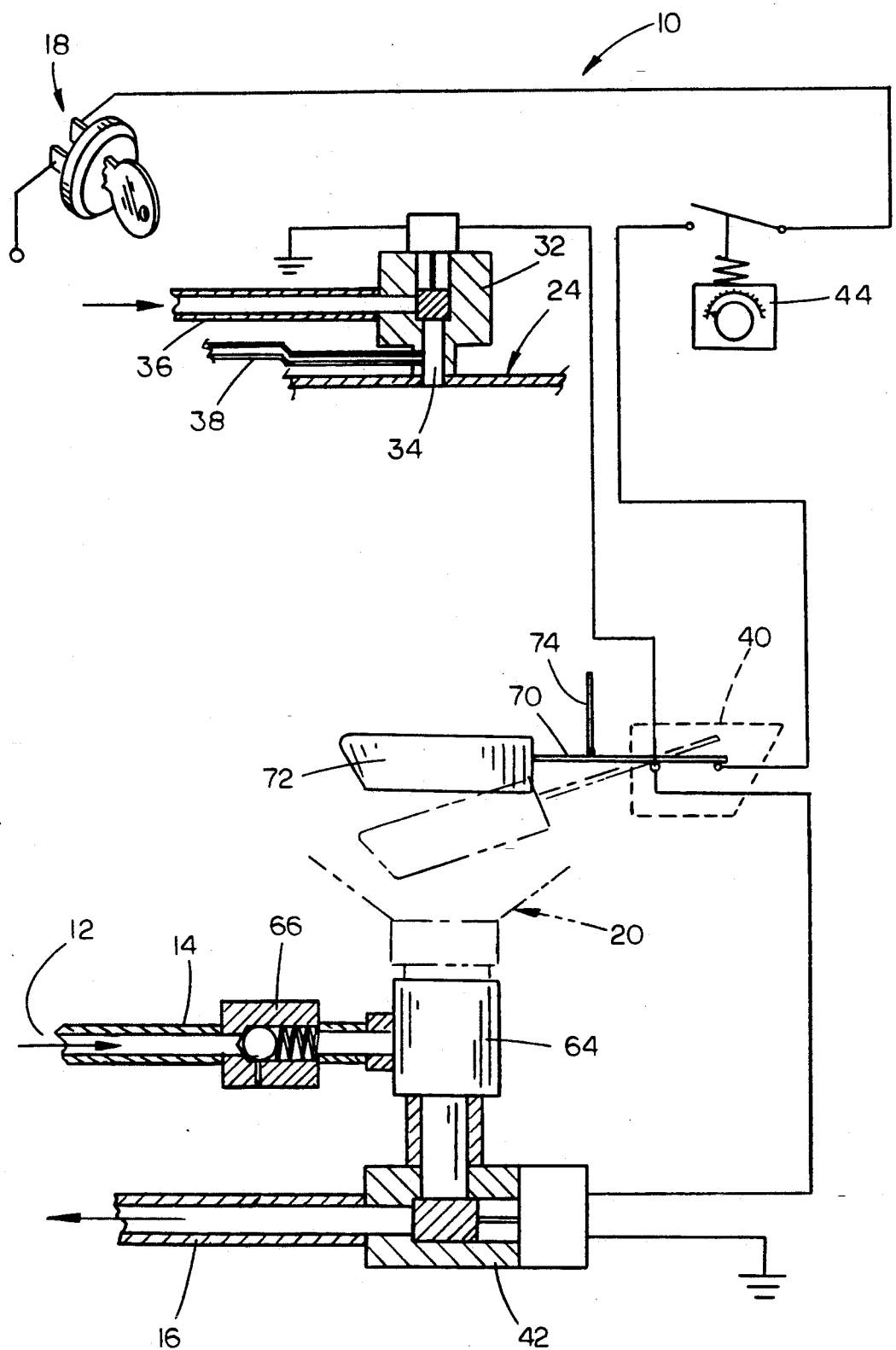
FIG. 7 is a schematic of the circuitry of the invention.

An air-in solenoid 32 is positioned on the upper end of air valve assembly and has a bore or passageway 34 in communication with the interior thereof (FIG. 7). An air line 36 extends from a conventional source of air pressure 37 on the truck, preferably in the area of 120 psi, and is connected to the solenoid 32. Solenoid 32 is normally closed as seen in FIG. 7 to prevent the flow of air under pressure into the interior of air valve assembly 24.

A self-venting line 38 is in communication with bore 34 in solenoid 32 to permit the venting of air from the interior of air valve assembly 24 to the crankcase as the pre-oiler is being refilled with oil. Vent line 38 is conventionally designed to prevent the passage of air therethrough when air is being supplied to the pre-oiler through line 36.

Solenoid 32 is electrically series connected to switch 40 which is electrically series connected to timer switch 44. Timer switch 44 is electrically series connected to key switch 18 as seen in FIG. 7.

Plate 44 defines the lower end of body portion 22 and has a plurality of openings 46 formed therein which provide fluid communication between body portion 22 and float body assembly 20. Float tube 48 is integrally formed with and extends downwardly from plate 44 (FIG. 5) and extends through the lower end of float body assembly 20. Float tube 48 is provided with an internally threaded portion 50 which threadably receives valve seat 52 having opening 54 formed therein. Float tube 48 includes an externally threaded portion 60 at its lower end. Float tube 48 is provided with a plurality of openings 56 formed therein which are positioned above valve seat 52. A bullet-shaped float 58 is floatably mounted in float tube 48 above valve seat 52 and has a lower end portion adapted to seat upon and seal opening 54 when the oil within float body assembly 20 drops to a predetermined level. Float tube 48 has a flange 59 at its lower end which is positioned above the inside lower end of float body assembly 20. Gasket 51 is positioned between flange 59 and the inside lower end of float body assembly 20. Nut 62 is threadably mounted on externally threaded portion 60 to hold the float tube 48 in position. Connector 64 connects solenoid 42 with the lower end of float tube 48 to permit oil to pass through line 16 when the normally closed solenoid 42 is opened. A one-way check valve 66 permits oil to flow from line 14 to connector 64 and into the lower end of float tube 48 while preventing oil flow from connector 64 into line 14. As seen in FIG. 5, line 16 has a conventional oil filter 67 imposed therein. Oil heater 68 is positioned within float body assembly 20 for heating the oil therein in conventional fashion to provide warm oil for easier cold weather starting.

Switch arm 70 extends from switch 40 and has a U-shaped float 72 mounted thereon. Leg 74 is pivotally mounted on arm 70 and extends upwardly through guide 76 positioned on plate 44.

Air line 78 is in communication with the interior of float body assembly 20 at the upper end thereof (FIG. 5). The inner end of air line 78 is orificed to permit the flow of air from float body assembly 20 as the piston 28 nears plate 44 during the pre-oiling cycle while preventing the flow of oil therethrough. Air line 80 extends from the crankcase 82 and is connected to connector 84. Connector 84 is connected to line 78 and is in communication with the interior of body portion 22 by means of orifice 86.

Assuming that the engine is operating and that the steel plate 28 had been previously lowered into the position illustrated by solid lines in FIG. 5 during the previous pre-oiling cycle, the oil chamber fills during normal engine operation by means of oil being supplied under pressure from the source 12 through the line 14 and being delivered upwardly through the float tube 48. The oil flows outwardly through the openings 56 into the float body assembly 20, upwardly through the openings 46, and moves the piston 28 upwardly to the position illustrated by broken lines in FIG. 5 as the oil chamber fills. As the steel plate 28 moves upwardly to the position illustrated by broken lines in FIG. 5, the air in the air chamber which is positioned above the piston 28 will be vented outwardly through the line 38. It is preferred that vent line 38 be in communication with the crankcase, rather than the atmosphere, so that if the diaphragm 26 breaks, the oil being delivered to the pre-oiler will not drain outwardly of the system but will drain back into the crankcase as a safety measure.

When the engine is shut down, with steel plate 28 held in place by magnet 30, oil will remain in the pre-lube oil chamber ready for use.

Before the engine is again started, key 18 will be turned to "run" position for approximately fifteen seconds which will activate both the air solenoid 32 and the oil solenoid 42 for approximately thirty seconds, or any desired timer setting, due to the timer 44. The actuation of the solenoid 32 causes the same to open so that air under pressure is provided to the system above piston 28. It is preferred at approximately 120 psi pressure be used although the same could be regulated down to a lower pressure if required. As the piston 28 is forced downwardly by the air pressure thereabove, the oil in the oil chamber will be forced outwardly through the line 16, through the filter 67 and into the engine where it will lubricate those parts requiring lubrication.

The pre-oil cycle will stop when the piston 28 engages the leg 74 to force switch arm 70 downwardly to its closed position. When switch 40 is opened, solenoids 32 and 42 are de-activated. With solenoids 32 and 42 de-activated, the solenoid 32 will close and vent the air chamber. Closing of the solenoid 42 halts the flow of oil from the pre-oiler to the engine. Once the engine is started, the oil chamber will refill through the smaller oil fill line 12. It is desired that oil fill line 12 be such a small diameter that the oil chamber will be slowly filled to prevent oil starvation during the refill process. When the oil chamber is refilled, the system will be ready for the next pre-oil or pre-lube cycle.

The pre-oiler of this invention utilizes the air system of the vehicle as a power source. Air could also be provided with a DC air compressor if so desired. By utilizing the air pressure of the vehicle as a power source, high oil pressure is provided in the pre-oiling cycle as well as high oil volume to the engine prior to start-up. Further, since the system is being pre-oiled by air pressure, excess battery drain is prevented during the pre-oil cycle.

Thus it can be seen that the invention accomplishes at least all its stated objectives.

I claim:

1. A pre-oiler assembly for pre-oiling an engine, comprising, a hollow body portion having upper and lower ends, a hollow float body assembly secured to the lower end of said hollow body portion and having upper and lower ends, an air valve assembly secured to said body portion, adjacent the upper end thereof, an upper interior of said hollow body portion being in fluid communication with an interior of said air valve assembly, a lower interior of said hollow body portion being in fluid communication with an upper interior of said float body assembly, said air valve assembly having an air inlet in communication with the lower interior of said hollow body, said air inlet being additionally in communication with a source of air under pressure, said air valve being a normally closed solenoid operated air valve, a movable means in said body portion sealably dividing said body portion into an oil chamber therebelow and an air chamber thereabove, said float body assembly having an oil outlet extending therefrom to the engine being pre-oiled, a normally closed solenoid operated oil valve imposed in said oil outlet, said float body assembly having an oil inlet in communication with the interior thereof, said oil inlet being in communication with a source of oil under pressure within the engine, a float switch means in said float body assembly which is series connected to the solenoids of said air valve and said oil valve, actuator means on said movable means for engaging said float switch means to open said float switch means when the oil in said oil chamber drops to a predetermined level, said float switch means deactivating the solenoids of the solenoid operated air and oil valves when the oil in said float body assembly drops to a predetermined level, and control means for actuating the solenoids of said air and oil valves and said float switch when it is desired to pre-oil the engine.

2. The pre-oiler assembly of claim 1 wherein said oil inlet provides a restricted flow so that the engine will not be oil starved as said pre-oiler is in a refill cycle after a pre-oiling cycle.

3. The pre-oiler assembly of claim 1 wherein a safety valve means is provided in said oil outlet to prevent air from being supplied to the engine, through said oil outlet in the event of a leak in said movable means.

4. The pre-oiler assembly of claim 1 further comprising an oil heater means positioned within said float body assembly for heating the oil to be supplied to the engine.

5. The pre-oiler assembly of claim 1 wherein said control means includes a timer means.

6. The pre-oiler assembly of claim 1 wherein a magnet means is provided at the upper interior of said hollow body portion, said movable means including a steel plate means which is selectively magnetically held in place to prevent bleed-down.

7. The pre-oiler assembly of claim 3 wherein said safety valve means comprises a vertically disposed float tube positioned in said float body assembly, a lower interior end of said float tube being in communication with said oil valve, an interior of said float tube, above the lower end thereof being in fluid communication with the oil in said float body assembly, a valve seat in said float tube above the lower end thereof, and a float member floatably mounted in said float tube for sealing engagement on said valve seat to prevent air from passing through said oil valve in the event of a leak occurring in said movable means.

* * * * *